Mar. 20, 1923. 1,449,241
L. F. MUSTEE.
DEVICE FOR LUBRICATING SPRINGS.
ORIGINAL FILED SEPT. 18, 1916. 2 SHEETS—SHEET 1.
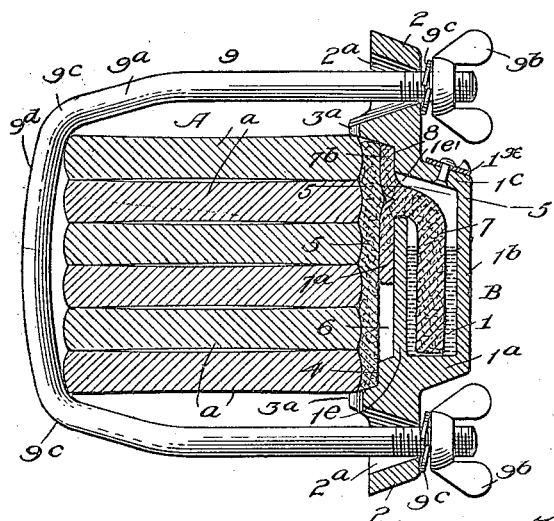
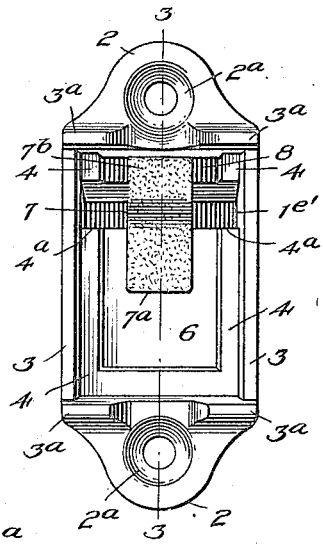
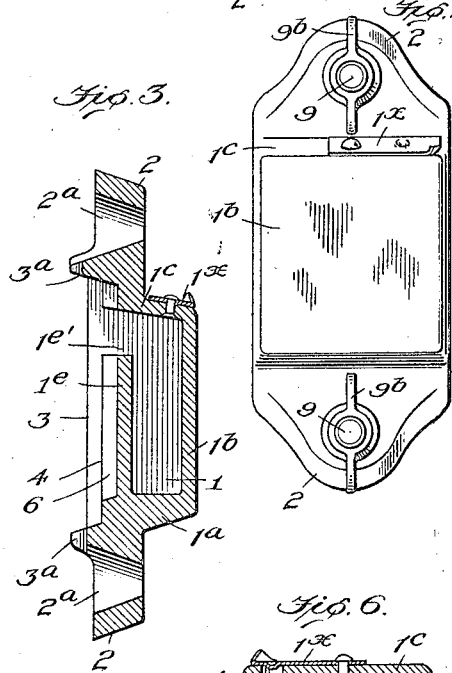
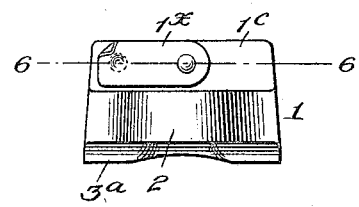
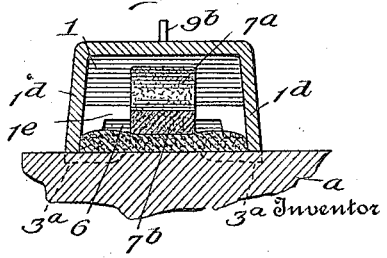
Witness
Edwin L. Bradford
Inventor
Lawrence F. Mustee
By Edward P. Alexander
Attorney

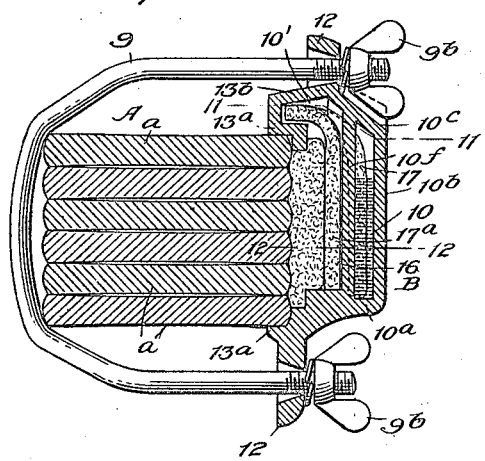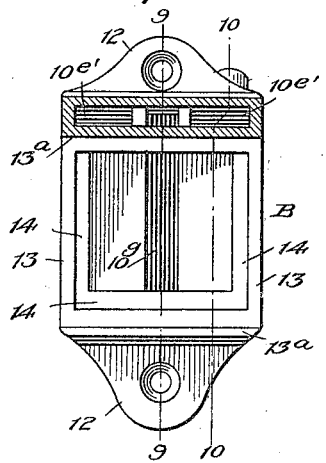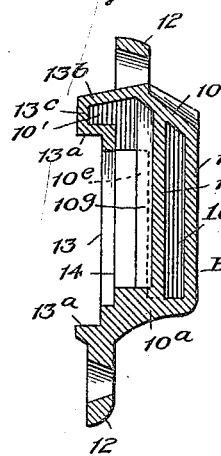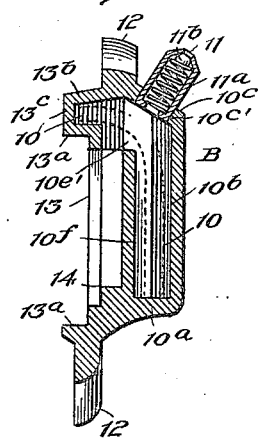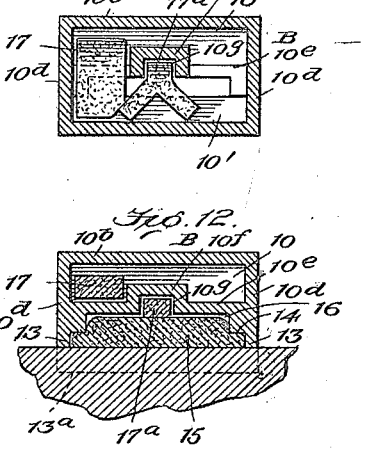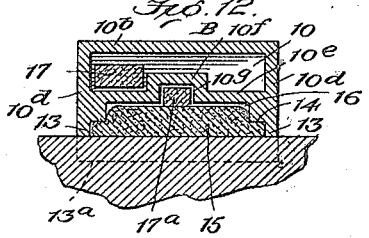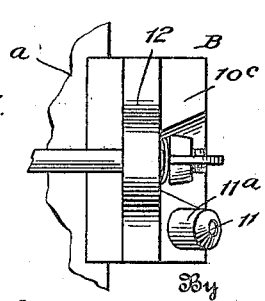

Patented Mar. 20, 1923.

1,449,241

UNITED STATES PATENT OFFICE.

LAWRENCE F. MUSTEE, OF CLEVELAND, OHIO.

DEVICE FOR LUBRICATING SPRINGS.

Application filed September 18, 1916, Serial No. 120,765. Renewed August 5, 1922. Serial No. 579,947.

*To all whom it may concern:*

Be it known that I, LAWRENCE F. MUSTEE, a citizen of the United States, residing at Cleveland, in the county of Cuyahoga and State of Ohio, have invented certain new and useful Improvements in and Relating to Devices for Lubricating Springs, of which the following is a specification.

This invention relates to devices adapted to supply oil to springs for lubrication purposes, more particularly to springs of the leaf type, such as are used on vehicles.

One object of the invention is to provide an improved device of this character capable of uniformly and efficiently supplying oil or lubricant to the spring leaves, whereby the latter may readily flex and move relatively to each other to effect easy riding qualities of the vehicle, as well as to avoid undue stresses upon and breakage of the leaves of the springs.

Another object of the invention is to provide improved means for securing the lubricating device to a spring, but permitting at all times, in flexing, free movements of the leaves of the spring relative to each other.

Another object of the invention is to provide improved means for securing a lubricating device to the spring of a vehicle but permitting relative movement between the device and the spring due to flexing of the latter.

With these and other objects in view, the invention consists of the part or parts, combination or arrangement of parts hereinafter described and set forth in the claims.

In the drawings, Fig. 1 is a sectional view of a spring and a lubricating device, embodying my invention, secured thereto.

Fig. 2 is a view looking at the inner side of the lubricating device with the oil delivery pad removed.

Fig. 2ª is a view looking at the outer side of the lubricating device.

Fig. 3 is a section on the line 3—3 of Fig. 2.

Fig. 4 is a top plan view of the lubricating device.

Fig. 5 is a section on the line 5—5 of Fig. 1.

Fig. 6 is a fragmentary section on the line 6—6 of Fig. 4.

Fig. 7 is a view similar to Fig. 1, illustrating a modified form of the invention.

Fig. 8 is a view of the modified form of the invention, looking at the inner side thereof, the distributor being omitted.

Fig. 9 is a section on the line 9—9 of Fig. 8.

Fig. 10 is a section on the line 10—10 of Fig. 8.

Fig. 11 is a section on the line 11—11 of Fig. 7.

Fig. 12 is a section on the line 12—12 of Fig. 7.

Fig. 13 is a top plan view of the lubricating device illustrated in Fig. 7.

Fig. 14 is a sectional view on the line 11—11 of Fig. 7, but illustrating another form of the invention.

In the drawings, A indicates as an entirety a leaf type of spring for a vehicle (not shown). The spring A is formed from a plurality of resilient leaves or strips $a$, arranged face to face and adapted to flex or spring in a well known manner. For illustrative purposes, I have shown the spring A as composed of six members $a$, to the side edges of which my improved lubricator or oiling device, indicated as an entirety at B, is adapted to be secured.

Referring to the oiling device B, 1 indicates a reservoir for a lubricating material, such as oil. The reservoir 1 may comprise a bottom wall $1^a$, a back or outer wall $1^b$, a top wall $1^c$, side walls $1^d$, and an inner wall $1^e$. The upper edge of the inner wall $1^e$ terminates at a point remote from the top wall $1^c$ to form an opening $1^{e'}$ leading from the reservoir 1. The walls constituting the reservoir are preferably formed integral, as by casting in a suitable mold. The side walls $1^d$ are preferably inclined outwardly relative to the back $1^b$ to facilitate manufacture.

Suitable lubricating oil may be supplied to the reservoir 1 through an opening $1^{c'}$ preferably formed in the top wall $1^c$ and normally closed by a suitable cover $1^x$.

2 indicates ears preferably formed integrally with and extending vertically from the top and bottom walls $1^c$, $1^a$. Each ear 2 is preferably formed with a conical opening $2^a$, the purpose of which will be later described.

3 indicates side members or ribs preferably formed integral with the side walls $1^d$ and extending forwardly therefrom.

The side members may extend from top to bottom of the oiling device B and serve to engage the side edges of the spring strips or leaves a when the oiling device B is secured thereto, as shown in Fig. 1. 3ª indicates shoulders projecting laterally from the ears 2 and adapted to engage the outer or exposed faces of the upper and lower spring strips a, thereby preventing movement of the oiling device B vertically or transversely of the spring A.

4 indicates a seat or support extending along the sides of the side members 3 and the inner side of the lower shoulder 3ª. The seat or support 4 serves as a back for a section of absorbent material, such as felt, or woven material 5, which feeds or delivers the lubricant to or between the spring strips a. The absorbent material 5 is of proper consistency to readily absorb and then discharge and distribute the lubricant to the side edges of or the spaces between the spring leaves. On account of suction effect due to the flexing and rubbing of the spring strips relatively to each other, the oil is supplied to the spring leaves by the distributor 5 in an efficient manner, as will be later described. The seat 4 is preferably arranged in a plane substantially midway between the inner wall 1ᵉ and the free longitudinal edges of the side members 3, so as to form (1) a suitable back or support for the section of absorbent material 5 and hold it relatively close to or in engagement with the edges of the spring leaves a and (2) a chamber 6 between the section of material 5 and inner wall 1ᵉ. The distributor 5 is preferably of a size and shape to fit within the space bounded by the side members 3 and shoulders 3ª. By this construction the distributor 5 is not clamped or compressed between the spring A and any part or parts of the oiling device B, such as the side members 3, when the device is secured to the spring. The distributor 5 is of such thickness that it will fit between the seat 4 and the spring leaves a and be held in proper engagement with the latter without being materially compressed, it thereby being free to substantially uniformly and evenly distribute the lubricating material to the spring leaves. This form of construction permits all portions of the section of material 5 to contact uniformly with the adjacent edges of the spring leaves, so that substantially the same quantity of oil is delivered to the spaces between opposing faces of the springs. The distributor 5 may be cemented, or otherwise secured, along its back surface to the seat 4. The seat 4 is preferably broken away, as shown at 4ª, 4ª, to leave the opening 1ᵉ′ unobstructed.

As shown in the drawings, the seat 4 is preferably formed integral with the side members 3, shoulders 3ª and wall 1ᵉ. When so constructed, the side walls of the seat serve to form the side walls for the chamber 6.

7 indicates means for delivering or feeding the lubricating material from the reservoir to the distributor 5 and chamber 6, either or both. The feeding means 7 preferably comprises a section of absorbent material, such as felt, or woven fabric, through which the lubricating oil may feed by capillary attraction. The section of material 7 may extend from the bottom of the reservoir 1 upwardly and laterally through the opening 1ᵉ′. The free end of the section of material 7 may be bent over the wall 1ᵉ and extended downwardly into the chamber 6 between the wall 1ᵉ and pad 5 with which it engages. By preference, the upper end of the felt section 7 is split or divided into legs 7ª, 7ᵇ; the leg 7ª being bent downwardly into the chamber 6 and the leg 7ᵇ being bent upwardly and arranged between the pad 5 and a wall 8 which form the rear wall of the chamber 6, above the opening 1ᵉ′.

The oiling device B may be secured to the spring A in any desired manner, but by preference such device is secured to the spring by improved means, indicated as an entirety at 9, which engage and hold both ends of the oiling device B against the spring A, at the same time permit relative movements between the spring leaves a, as well as relative movements between the oiling device B and the securing means 9. Of the securing means 9, 9ª indicates a bow member extending from the ears 2 around the spring A. The opposite or free ends of the bow member extend through the openings 2ª and are screw-threaded to receive nuts 9ᵇ. The arms of the bow member are preferably spaced from the exposed faces of the upper and lower spring leaves a. At points 9ᶜ, the arms of the bow member 9ª are bent inwardly for engagement with the exposed corners of the upper and lower spring leaves a, around which corners they may be curved or bent relatively sharp, but between them the bottom portion of the bow member 9ª is spaced or bowed from the edges of the spring leaves a, as shown at 9ᵈ. From the foregoing description it will be seen that the bow member 9ª does not engage or contact with the upper, lower and exposed side edges of the spring leaves, but is spaced therefrom at all points except at the upper and lower corners; also that between its connections with the oiling device B and the corner edges of the spring A, the bow member is bowed so that it can flex slightly and compensate for any strains imparted to it by the flexing of the spring leaves a. By this form of construction I am enabled to (1) securely attach the oiling device B to the spring leaves without affecting their functions as a spring for the vehicle, (2) prevent undue strains upon the bow member 9ª, and (3) eliminate friction between the spring leaves $a$ at all points except at the corners, thus permitting the spring leaves to freely move or rub relatively to each other. By making the openings 2ª of conical shape, it will be seen that if any lateral movement of the oiling device B occurs, the oiling device and bow member 9ª can rock relative to each other within certain limits, without displacement of the oiler B, the nuts 9ᵇ and walls of the ears 2 serving as pivots for this purpose. I preferably provide between each nut 9ᵇ and ear 2 a spring washer 9ᶜ which serves to lock the adjacent nut in position and readily permit pivotal movement between the oiler B and bow member 9ª.

The operation of the oiling device may be described as follows: the reservoir 1 is filled with suitable oil which feeds upwardly through the feeder 7 to the section or pad of material 5 and into the chamber 6; from the feeder 7 and chamber 6 the oil is absorbed by the pad 5, which in turn discharges it on the edges and between the opposing faces of the spring leaves $a$.

The flexing of the spring and relative movement or rubbing action of the spring leaves $a$ sets up a sucking effect upon and through the pad of material 5 and creates a vacuum in the chamber 6; this vacuum effect in turn tends to cause the oil in the reservoir to feed relatively fast through the wick or feeder 7: the oil working up through the feeder 7 is delivered to the pad 5 and chamber 6 from which it is supplied to the spring leaves $a$.

The pad 5 is preferably of a size to fit entirely over the vacuum chamber 6, so that the action of the spring leaves $a$ upon the pad 5 will create a vacuum in the chamber 6 and increase the supply of oil normally feeding through the wick. This vacuum effect occurs each time the spring leaves flex; hence if the vehicle, to which the spring is applied, is being so driven that the spring is flexed to a great extent, the vacuum effect in the chamber 6 will be increased proportionately. It will therefore be seen that the vacuum chamber 6 and pad 5 operate as a pump to draw the oil from the reservoir 1, and that such action is automatically increased and diminished as the flexing of the spring increases and diminishes. The supply of oil is therefore regulated or controlled by the spring action, so that efficiency of lubrication is attained on the one hand and on the other economy of oil.

Referring to Figs. 7 to 13, inclusive, 10 indicates a reservoir for the lubricating material. The reservoir 10 may comprise a bottom wall 10ª, a back or outer wall 10ᵇ, a top wall 10ᶜ, side walls 10ᵈ, and an inner wall 10ᵉ. The central portion of the wall 10ᵉ is preferably off-set as shown at 10ᶠ to form a channel 10ᵍ, the purpose of which will be later set forth. The off-set wall 10ᶠ is preferably connected at its upper end to the top wall 10ᶜ. The wall 10ᵉ, at either or both sides of the off-set wall 10ᶠ, terminates at a point remote from the top wall 10ᶜ to form the opening or openings 10ᵉ'. The walls of the reservoir 1 are preferably formed integral.

The lubricating oil may be supplied to the reservoir 1 through an opening 11 in a cap 11ª which fits an opening 10ᶜ' formed in the top wall 10ᶜ. The opening 11 is preferably controlled by a spring operated ball 11ᵇ.

12 indicates ears preferably formed integrally with and extending vertically from the top and bottom walls 10ᶜ, 10ª, respectively. Each ear is preferably formed with a conical opening to receive one end of a suitable clamping member, such as indicated at 9 in Fig. 1.

13 indicates side members or ribs preferably formed integral with the side walls 10ᵈ and extending forwardly therefrom. The side members 13 may extend from top to bottom of the oiling device B and serve to engage the side edges of the spring strips $a$ when the oiling device is secured thereto, as shown in Fig. 7. 13ª indicates shoulders projecting laterally and adapted to engage the outer exposed faces of the upper and lower spring strips $a$ to prevent movement of the oiling device vertically or transversely of the spring A.

13ᵇ indicates a supplemental wall or extension formed integral with the top wall 10ᶜ. 13ᶜ indicates a plate or wall preferably connected at its lower end to the front edge of the adjacent shoulder 13ª. The walls 13ᵇ and 13ᶜ co-operate with the side members 13 to form a pocket or chamber 10' in the upper end of the casing.

14 indicates a seat or support extending along the inner sides of the ribs 13 and lower shoulder 13ª. The seat or support 14 serves as a back for a section of absorbent material, such as felt or woven fabric, 15, through and by means of which the lubricating material is delivered to or between the spring strips $a$, as already described with reference to the distributor 5. The seat 14 serves to support the distributor 15 against the spring A but spaced from the wall 10ᵉ, so as to form a vacuum chamber 16.

In this form of the invention the feeding means for the lubricating material comprises a pair of feeders 17, 17ª, each preferably formed from felt, woven fabric or other suitable absorbent material. The feeder 17 extends from the bottom of the reservoir 10 upwardly and then laterally through an opening 10e′ into the chamber 10′.

The feeder 17a leads from the chamber 10′ to the pad 15 and into the vacuum chamber 6. The feeder 17a preferably extends downwardly through the channel 10s substantially to the bottom thereof. The feeder 17a thus serves as a lubricant conductor from the feeder 17 to the distributor 15.

From the foregoing description it will be seen that the feeder 17a is arranged centrally of the distributor 15 so as to feed oil thereto at a point equal distance from its opposite side edges. The feeder 17a is preferably of sufficient thickness to engage the pad 15 substantially throughout its entire length. It will also be seen that the side walls of the channel 10s serve as means for maintaining the feeder 17a centrally of the pad 15 at all times.

The form of construction illustrated in Figs. 7 to 13, inclusive, is particularly adapted for oiling springs which are subjected to severe usage; in this form of the invention the oil must rise by capillary attraction to a point or a chamber above the springs before it is conducted to the distributor; hence the feed of the oil is retarded. Where it is desired to increase the supply of oil, I may use two feeders 17, as shown in Fig. 14.

To those skilled in the art of making devices of the class described, many alterations in construction and widely differing embodiments and applications of my invention will suggest themselves, without departing from the spirit and scope thereof. My disclosures and the description herein are purely illustrative and are not intended to be in any sense limiting.

What I claim is:

1. In a device of the character described, the combination of a reservoir and a chamber, the dividing wall therebetween being formed with an opening, a flexible member, means for supporting said flexible member in spaced relationship to said wall and in engagement with a vehicle spring, and a feeder extending from said reservoir through the opening in said dividing wall and into the space between said wall and said flexible member.

2. The combination of a casing comprising an oil reservoir adapted to be connected to a vehicle spring, a distributor for the oil arranged to engage the spring, means for supporting said distributor in spaced relationship to the rear wall of said reservoir to form a chamber between said distributor and said rear wall, and means for supplying oil from said reservoir to said chamber.

3. The combination of a casing comprising an oil reservoir and laterally extended walls adapted to engage with a vehicle spring, a distributor for the oil arranged to engage the spring, means for supporting said distributor in spaced relationship to the rear wall of said reservoir to form a chamber between said distributor and said rear wall, and means for supplying oil from said reservoir to said chamber.

4. The combination of a casing comprising an oil reservoir and laterally extending walls adapted to engage with a vehicle spring, said walls co-operating with the adjacent wall of the reservoir to form a chamber, a distributing member arranged between said laterally extending walls, means for supporting said distributor in engagement with the spring but spaced from the adjacent wall of the reservoir, and means through which the oil in said reservoir flows to said chamber.

5. The combination of a casing comprising an oil reservoir and laterally extending walls adapted to engage with a vehicle spring, said walls co-operating with the adjacent wall of the reservoir to form a chamber, a distributing member arranged between said laterally extending walls, ribs for supporting said distributor in engagement with the spring but spaced from the adjacent wall of the reservoir, and means through which the oil in said reservoir flows to said chamber.

6. The combination of a casing comprising a reservoir, laterally extending walls adapted to engage with a vehicle spring, and a seat extending along said walls, a distributor arranged on said seat and forming with the adjacent wall of said reservoir a vacuum chamber, and means for conducting oil from said reservoir to said chamber, said distributor engaging said spring and actuated thereby to pump or draw oil through said conducting means.

7. The combination of a casing comprising a reservoir, laterally extending walls adapted to engage with a vehicle spring, and a seat extending along the inner face of each said wall, a distributor arranged on said seats and forming with the adjacent wall of said reservoir a vacuum chamber, and means for conducting oil from said reservoir to said chamber, said distributor engaging said spring and actuated thereby to pump or suck oil through said oil conducting means.

8. The combination of a casing comprising a reservoir, laterally extending walls adapted to engage with a vehicle spring, and a seat extending along the inner face of each said wall, a distributor arranged on said seats and forming with the adjacent wall of said reservoir a vacuum chamber, the rear wall of said reservoir being formed with an opening between the upper and lower edges of said distributor, and a section of absorbent material leading from said reservoir through the opening to the distributor for conducting oil to the latter, said distributor engaging said spring and actuated thereby to pump or suck oil through said oil conducting material.

9. The combination of a casing comprising a reservoir, laterally extending walls adapted to engage with a vehicle spring, and a seat extending along the inner face of each said wall, a distributor arranged on said seats and forming with the adjacent wall of said reservoir a vacuum chamber, the rear wall of said reservoir being formed with an opening between the upper and lower edges of said distributor, and a section of absorbent material leading from said reservoir through the opening to the distributor for conducting oil to the latter, the outer end of said absorbent material being provided with arms one of which extends downwardly and the other of which extends upwardly, and said distributor engaging said spring and actuated thereby to pump or suck oil through said oil conducting material.

10. The combination of a casing adapted to be connected to a vehicle spring, said casing comprising an oil reservoir and a chamber thereabove, a device engaging the side edges of the spring and arranged to deliver oil thereto, a feeder leading from the reservoir upwardly to said chamber, and a separate feeder extending from said chamber to said delivery device.

11. The combination of a casing adapted to be connected to a vehicle spring, said casing comprising an oil reservoir and a chamber thereabove, a device engaging the side edges of the spring and arranged to deliver oil thereto, a feeder leading from the reservoir upwardly to said chamber, a separate feeder extending from said chamber to said delivery device, and means for maintaining said separate feeder in operative position.

12. The combination of a casing adapted to be connected to a vehicle spring, said casing comprising an oil reservoir and a chamber thereabove, a device engaging the side edges of the spring and arranged to deliver oil thereto, a feeder leading from the reservoir upwardly to said chamber, a separate feeder extending from said chamber to said delivery device, and means for maintaining said separate feeder centrally of said delivery device in operative position.

13. The combination of a casing adapted to be connected to a vehicle spring, said casing comprising an oil reservoir and a chamber thereabove, means for feeding oil from said reservoir to said chamber, and means for feeding oil from said chamber to the side edges of the spring.

14. The combination of a casing adapted to be connected to a vehicle spring, said casing comprising an oil reservoir and a chamber thereabove, means for feeding oil from said reservoir to said chamber, and means for feeding oil from said chamber to the side edges of the spring, the last said means comprising an oil distributing member and a feeder leading from said chamber to said member.

15. The combination of a casing adapted to be connected to a vehicle spring, said casing comprising an oil reservoir and a chamber thereabove, means for feeding oil from said reservoir to said chamber, means for feeding oil from said chamber to the side edges of the spring, the last said means comprising an oil distributing member and a feeder leading from said chamber to said member, and means for maintaining said feeder in operative position.

16. The combination of a casing adapted to be connected to a vehicle spring, said casing comprising an oil reservoir and a chamber above the level of the oil in said reservoir, means for feeding oil from said reservoir to said chamber, and means for feeding oil from said chamber to the side edges of the spring, the last said means comprising an oil distributing member and a feeder leading from said chamber to said member and having contact therewith from its upper to its lower edge.

17. The combination of a casing adapted to be connected to a vehicle spring, said casing comprising an oil reservoir and a chamber above the level of the oil in said reservoir, means for supporting a section of oil distributing material in engagement with the side edges of the spring but spaced from the front wall of said reservoir, means for feeding oil from said reservoir to said chamber, and means for delivering oil from the chamber to the space between the distributing material and the front wall of said reservoir.

18. The combination of a casing adapted to be connected to a vehicle spring, said casing comprising an oil reservoir and a chamber above the level of the oil in said reservoir, means for supporting a section of oil distributing material in engagement with the side edges of the spring but spaced from the front wall of said reservoir, means for feeding oil from said reservoir to said chamber, and an oil feeder leading from the chamber to the space between the distributing material and the front wall of said reservoir.

19. The combination of a casing adapted to be connected to a vehicle spring, said casing comprising an oil reservoir and a chamber above the level of the oil in said reservoir, means for supporting a section of oil distributing material in engagement with the side edges of the spring but spaced from the front wall of said reservoir, means for feeding oil from said reservoir to said chamber, and means for delivering oil from the chamber to the space between the distributing material and the front wall of said reservoir and arranged to engage said distributing material.

20. The combination of a casing adapted to be connected to a vehicle spring, said casing comprising an oil reservoir and a chamber above the level of the oil in said reservoir, means for supporting a section of oil distributing material in engagement with the side edges of the spring but spaced from the front wall of said reservoir, means for feeding oil from said reservoir to said chamber, and means for delivering oil from the chamber to the space between the distributing material and the front wall of said reservoir and arranged to engage said distributing material, the front wall of said reservoir being provided with a channel to receive said feeder.

21. The combination with a vehicle spring and a lubricator of means for securing the lubricator to said spring, said means comprising a U-member having pivotal connection at its opposite ends with said lubricator.

22. The combination with a vehicle spring and a lubricator of means for securing the lubricator to said spring, said means comprising a member surrounding said spring and having pivotal connection at its opposite ends with said lubricator and the opposite exposed corners of the spring.

23. The combination with a vehicle spring and a lubricator, of a resilient U-member connected at its opposite ends to said lubricator and engaging the exposed corners of the said spring, the portions of the U-member between its engagement with the spring and connection with said lubricator being bowed.

24. The combination with a vehicle spring and a lubricator, of a resilient U-member connected at its opposite ends to said lubricator and engaging the exposed corners of the said spring, the portion of the U-member between its engagement with the corners of said spring being bowed.

25. The combination with a vehicle spring and a lubricator, of a resilient U-member connected at its opposite ends to said lubricator and engaging the exposed corners of the said spring, the portions of the U-member between its engagement with the spring and connection with said lubricator and between the corners of said spring being bowed.

In testimony whereof I affix my signature, in the presence of two witnesses.

LAWRENCE F. MUSTEE.

Witnesses:
GEO. B. PITTS,
JOSEPH A. MUSTEE.